United States Patent [19]

Hagberg et al.

[11] 4,299,189

[45] Nov. 10, 1981

[54] DIPPING DEVICE

[75] Inventors: Lars Hagberg, Borlänge; Ake Jonsen, Sundborn, both of Sweden

[73] Assignee: Aktiebolaget Indesko, Stockholm, Sweden

[21] Appl. No.: 147,157

[22] Filed: May 6, 1980

[30] Foreign Application Priority Data

May 11, 1979 [SE] Sweden ............................ 7904154

[51] Int. Cl.$^3$ ........................ B05C 3/10; B65G 49/02
[52] U.S. Cl. .................................. 118/675; 118/426; 118/428; 134/133; 134/159
[58] Field of Search .............. 118/426, 668, 675, 500, 118/428; 134/133, 159

[56] References Cited

U.S. PATENT DOCUMENTS

| | | | |
|---|---|---|---|
| 471,284 | 3/1892 | Walters et al. | 118/426 |
| 1,432,578 | 10/1922 | Thomas et al. | 134/159 |
| 2,355,278 | 8/1944 | Davis | 118/426 |
| 2,856,895 | 10/1958 | Anderson | 118/426 |
| 3,237,632 | 3/1966 | Silberzahn | 134/159 |
| 4,124,729 | 11/1978 | Kubota et al. | 118/426 |

Primary Examiner—Ralph S. Kendall

Attorney, Agent, or Firm—Hane, Roberts, Spiecens & Cohen

[57] ABSTRACT

A device for dipping plates (40) in a liquid (70) includes a plurality of elements (20) which form a number of disc-like devices secured at a certain distance from each other on a rotatable shaft (30). Each element is provided with several evenly spaced recesses for receiving the plates and each plate received rests in at least two recesses. The elements are partially immersed in the liquid. The drive mechanism rotates the shaft in steps and the recesses, together with the plates contained in them, then pass through the liquid. During the pauses between the elements rotating, a feeder device (51) pushes the plates into the recesses (21') in the elements from a feeder table (52), whereas the dipped plates are moved by an ejector device (61) to a receiving device (62. The receiving device has a number of compartments (64) with surfaces (60) located above one another, and these compartments are gradually moved into position for receiving the dipped plates. A control and computing device deducts the number of plates delivered from the number of compartments in the receiving device, so that the storage capacity of the latter will not be exceeded.

5 Claims, 2 Drawing Figures

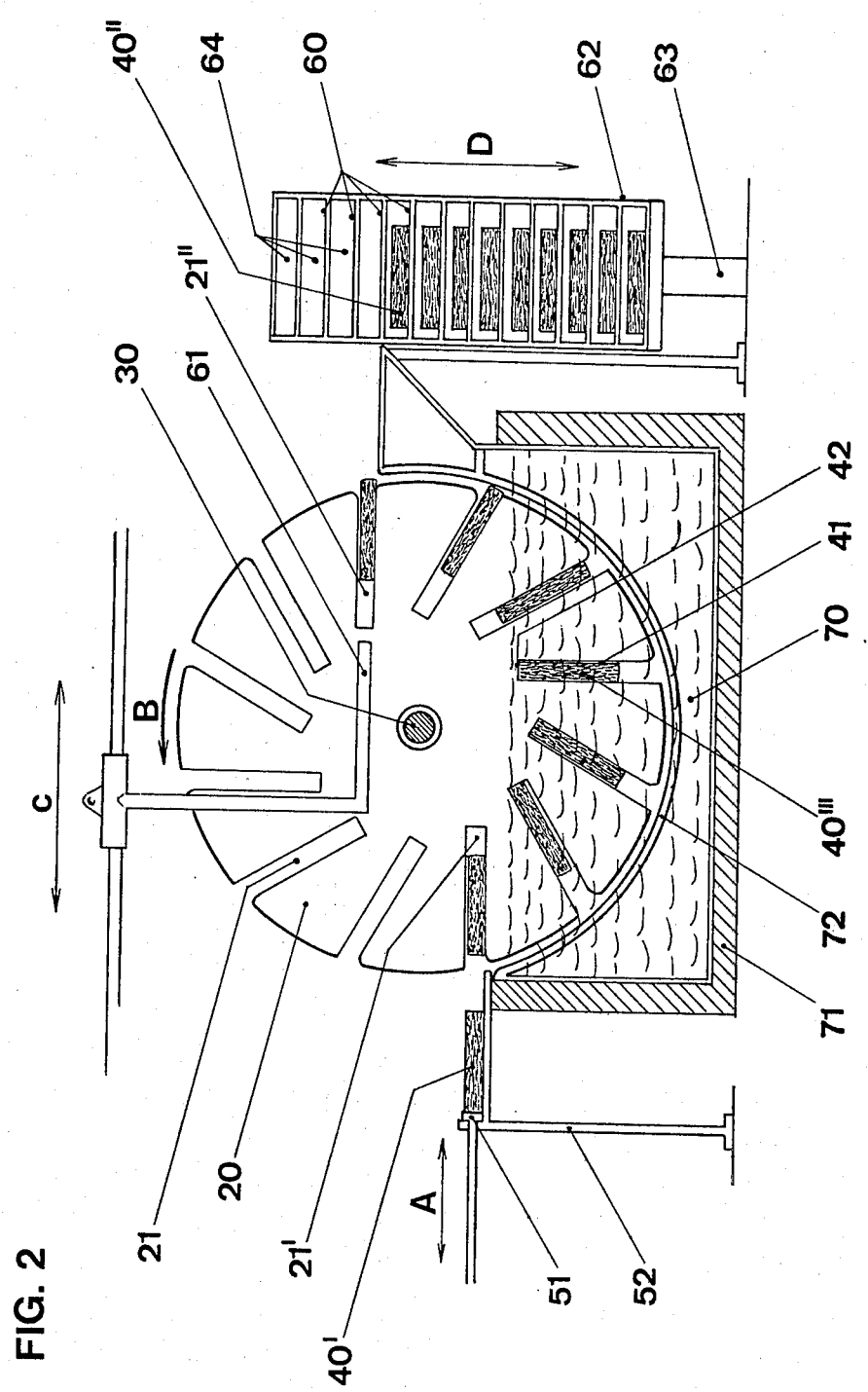

DIPPING DEVICE

BACKGROUND OF THE INVENTION

This invention refers to a method and a device in accordance with the method for dipping primarily flat plates in a liquid.

In cases such as the impregnation of plates, it is very common to use a dipping procedure. It is desirable for many reasons, such as aspects associated with the working environment, production costs, production quality, etc., to mechanize the dipping of plates.

One example of industrial production in which plates are dipped for impregnation is the manufacture of lining slabs for ingot moulds. The purpose of impregnation is to increase the ability of the slabs to withstand the heat of the molten steel, by the addition of the impregnating liquid. This liquid is expensive and optimum distribution of the liquid in each plate is therefore of a great economic significance. During the impregnation procedure, the liquid must be distributed so that the part of the slab facing the molten steel in the ingot has a higher concentration of the impregnation agent than the part facing towards the ingot mould wall. Similarly, the bottom parts of the slabs must have a higher concentration of impregnation agent than their top parts. The top and bottom parts mentioned above refer to the top and bottom parts when the slabs are placed in the ingot mould.

A known dipping procedure for the impregnation of lining slabs is to use gripping devices which grip the slabs in limited areas and lower them into the impregnation liquid for the required period of time. The gripping devices then often grip the slabs generally adjacent to their upper edge sections. The dipping devices are often mechanically complicated, since the slabs are usually stored resting on their flat sides, before as well as after dipping. The dipping procedures are therefore associated with two turning movements. The slabs often consist of fibrous material, and magnetic holders therefore cannot be used.

A disadvantage of the use of the procedure described above is that direct contact between the slabs and the impregnating liquid is not possible in areas of the slabs held by the gripping device. In these areas, the impregnation will therefore be poorer than in the surrounding areas and must subsequently be re-impregnated. Neither does the dipping procedure described above allow for optimum distribution of impregnating liquid in the slabs, so that the side of the slab which comes into direct contact with the molten steel in the ingot mould will have the highest impregnation.

SUMMARY OF THE INVENTION

This invention concerns a method and a device for dipping sheets or plates in a liquid, e.g. for impregnating lining slabs for ingot moulds. According to the invention, the device accepts slabs resting on their flat sides and, after dipping, places them in a storage device in which the plates are stored on the flat sides, to allow the liquid to drain off and the plates to dry.

The device according to the invention dips the plates in the liquid in such a manner that none of the surfaces of the plates are prevented from coming into direct contact with the liquid. The need for re-impregnation is thus eliminated. In addition, the invention satisfies the need for storing the dipped plates in a number of compartments above each other. This minimizes the storage space required for draining after dipping and for drying.

The special demand for a lining slab that the concentration of a impregnation agent in the slab material should vary from one side of the slab to the other and from one edge of the slab to the other (the top or bottom edge when the slab is placed in the ingot mould) is also satisfied by the invention.

According to the invention, a dipping device is arranged between the storage device for intermediate storage of as yet undipped slabs and the receiving device for dipped slabs. The dipping device includes of a number of disc-like elements secured at a certain distance from each other along a rotatable shaft. Recesses sized to accommodate the dimensions of the slabs are arranged along the peripheries of the elements.

In addition, the recesses are arranged in such a manner that every slab received rests in at least two recesses.

A container with liquid is arranged adjacent to the bottom parts of the elements. The elements are immersed in the liquid to such a depth that, as the shaft and thus the elements rotate, the recesses will pass completely or partially below the liquid surface.

The storage device for intermediate storage of undipped plates consists of, for instance, a receiving device connected to the production equipment for slabs. The storage device, which forms a feed table for the dipping device, has a length corresponding to the distance between the outermost elements on the shaft mentioned earlier, although the length usually exceeds this distance slightly. The feed table and dipping device are arranged in such a manner in relation to each other that when a number of recesses in the elements are in position for receiving slabs, the recesses are at the same height as the surface of the feed table. A feed device displaces the slabs from the feed table into the recesses in the elements.

The receiving device for dipped plates, which simultaneously acts as the storage device for finished plates, is arranged with a number of compartments located above one another, and these are displaced in a vertical direction by a drive device. The receiving device is arranged in such a manner that, when a compartment is in position for receiving slabs, the recesses in the elements from which the slabs are to be removed are at the same height as the surface of the relevant compartment. The vertical travel of the compartments is controlled in phase with the intermittent rotation of the shaft. An ejector device for moving the slabs from the recesses to the receiving device is arranged adjacent to the dipping device. The ejector device is arranged for operating between the disc-like elements, whereas the feed device in a preferred design is only moved up to the elements and does not enter between them.

The as yet undipped plates are moved successively out onto the feed table for intermediate storage of the slabs. Displacement preferably takes place by the last slab delivered pushing forward the immediately preceding slab. When the entire feed table is filled with slabs, this is signalled to a drive device which displaces the feed device towards the elements. The plates are then pushed into the recesses in the elements. After the slabs have moved into place, the feed device returns to its original position, at the same time as the shaft rotates to move a set of new recesses into place for receiving the next set of undipped plates.

After a number of intermittent rotary movements, the first plates are in position for discharging into the storage device for dipped slabs. The storage device is arranged in such a manner in relation to the dipping device that, at the same time as the recesses containing the slabs which are to be transferred to the storage device are in the correct positions for this transfer, another set of recesses assumes the correct position for receiving the slabs awaiting dipping on the feed table.

As already mentioned, the elements are immersed in the liquid by such an amount that, when the elements rotate, the recesses will pass entirely or partially below the liquid surface. The density of the material from which the slabs are made is usually lower than the density of the liquid. As a result, when the slabs pass through the liquid, they will tend to move upwards, and the recesses will therefore effectively retain these slabs without any additional devices. While these slabs are moved through the liquid, they will move in the recesses, and this offers the advantage that, during the dipping process, the liquid will be in direct contact with all surfaces of the slabs. This avoids shortcomings in the penetration of the liquid into parts of the slab material, since the surfaces in contact with the edges of the recesses will change.

The invention is also applicable to dipping procedures in which the density of the material from which the slabs are made is higher than the density of the liquid.

In an alternative design of the invention, stops are therefore arranged to prevent the slabs from sliding out of the recesses during their passage to the position in which the slabs are ejected from the recesses. The stops are preferably arranged in the form of guide rails located slightly outside the periphery of the elements. The guide rails then follow the edges largely along the entire distance from the feed position of the slabs to the discharge position of the slabs, thus forming basically semi-circular guide surfaces. In order to prevent the edge sections of the individual slabs from being in contact with the guide rails throughout the dipping procedure, the surfaces of the guide rails are not at right angles to the common axis of the elements. In an alternative embodiment, the stops are arranged adjacent to the openings of the recesses and are secured to the elements. The stops are then adjustable between a position in which they blank off the openings of the elements during dipping and a position in which the openings are unrestricted when the slabs are fed into and out of the recesses. Resetting may take place, for instance, by cams which affect the positions of the stops in conjunction with the rotation of the elements.

Even if the density of the material from which the slabs are made is higher than the density of the liquid, the slab will not be permanently in contact with any surfaces during passage through the liquid. Also in this application, the necessary all-round contact will be ensured between the material of the slabs and the liquid.

The elements in the dipping device itself rotate in steps, stopping for the slabs to be fed into and ejected from the recesses. The time during which the slabs are immersed is controlled by the speed of rotation and the duration of the periods of rest when the slabs are fed into and ejected from the recesses. During rotation, liquid is forced into the slabs, since the flat sides of the slabs face in the direction of rotation. The penetration of the impregnation liquid into the slab material will therefore be more effective on the side facing the direction of rotation than on the opposite side. The concentration of impregnation liquid is controlled by the speed rotation as well as by the time during which the slabs are immersed in the liquid. The dipping time can be extended either by extending the time during which the elements are stationary in conjunction with the slabs being fed in and ejected, or by altering the speed of rotation or by the slabs being passed through the liquid more than once or by a combination of these measures.

The rotation of the elements is determined by a control and computing device which thus controls the speed of rotation, the duration of the periods when the elements are stationary for insertion and ejection of the slabs and the number of times the slabs are made to pass through the liquid. The control equipment also ensures that the number of sets of recesses into which undipped slabs are inserted agrees with the number of compartments in the receiving or storage device which is connected to the dipping device at that particular time. In certain applications, suitable impregnation conditions are achieved by a number of recesses in the elements being left empty between the recesses into which slabs are inserted.

BRIEF DESCRIPTION OF THE DRAWING

The invention is described in more detail in conjunction with the drawing where:

FIG. 2 shows a section through the dipping device.

DETAILED DESCRIPTION

Figure 1:
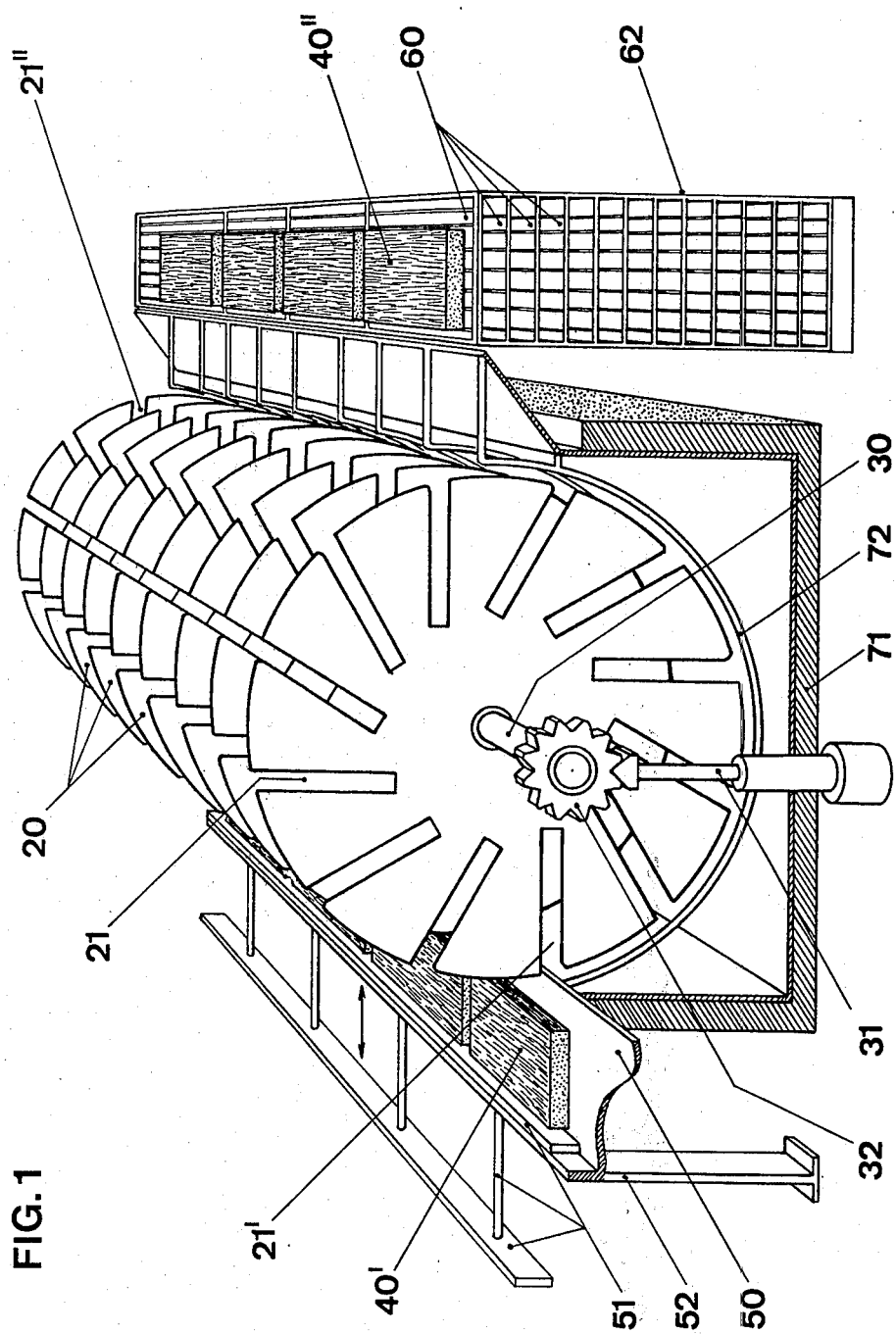
FIG. 1 shows a perspective view of a dipping device with feed table and receiving device, viewed from the discharge side, and where

FIGS. 1 and 2 show a number of disc-like elements 20 secured to a shaft 30 and located at a relatively small distance from each other. A number of recesses 21 are arranged around the periphery of the elements. Rectangular recesses are shown in the figures. The recesses are oriented towards the center of the elements in such a manner that the projection of the line of symmetry of each recess passes to one side of the center line of shaft 30. The elements are oriented so that the recesses together form coincident openings in the longitudinal direction of the shaft.

Shaft 30 is rotatably mounted, preferably at both ends (not shown in the figures). By means of some known technique, e.g. using a step feed mechanism, a Maltese cross mechanism, etc., the shaft is rotated at every step in the direction of arrow B by exactly the amount corresponding to the distance between a predetermined number of recesses in the elements.

In a typical design with a step feed mechanism, a gearwheel 32 and a locking device 31 give the shaft and thus the elements a correct stop position after each rotary movement.

A storage device and combined feed table 52 for undipped slabs 40' is arranged so that the surface 50 of the storage device, with the elements in a stationary condition, is at the same height as a number of recesses 21' in the elements 20. A feed device 51 is movable as shown by the double arrow A towards the elements 20 and back to the initial position.

A receiving device 62 for dipped slabs 40" is arranged with a number compartments or storage levels 64 located above one another and provided with storage surfaces 60. The receiving device is displaced by the drive device 63 in a vertical direction, and this illustrated by the double arrow D. With the elements 20 in a stationary condition, one of the surfaces 60 is always at the same height as a number of recesses 21" of the elements 20. Displacement of the compartments in a vertical direction takes place in steps, with one step for every movement of the shaft 30. An ejector device 61 is movable as shown by the double arrow C and moves the dipped slabs from the recesses 21" of the elements to the compartments in the receiving device 62. The ejector device is arranged between the elements 20 and above the shaft 30 and, wherever applicable, is movable to a position where the ejector device is completely outside the elements 20.

It can be seen that the recesses 21 in the elements 20 are oriented in such a manner that there is a difference in level between the recesses 21' which are in the receiving position for undipped slabs and recesses 21" which are in the delivery position for dipped plates. This facilitates the arrangement of the ejector device 61 which can thus operate in an area above the shaft 30. This, in turn, enables the diameter of the elements 20 to be reduced as compared to the diameter which would be necessary if there were no difference in levels.

A container 71 with liquid 70 is arranged below the shaft 30. The elements 20 are immersed in the liquid by a sufficient amount so that the recesses 21 will pass entirely or partially below the liquid surface when the shaft rotates.

In an embodiment of the device intended for dipping slabs consisting of a material with a density which is higher than that of the liquid guide rails 72 are arranged below the elements 20. The guide rails form semi-circular arcs which largely follow the periphery of the elements. The plane through the guide rails does not form a right angle with the central axis of the elements.

The figures also show a number of slabs 40 in various stages of treatment. Thus, undipped slabs 40' are located on the feed table before insertion into the recesses 21' of the elements, slabs 40" in compartments 64 of the receiving device 62 and slabs 40'" below the liquid surface. The sides of the slabs facing the direction of travel have the reference designation 41, whereas the top edge of the slabs during dipping are designated 42.

The operation of the device is described in the following. From a production plant (not shown), undipped plates are fed onto surface 50 of the feed table 52. When the feed table has been filled with slabs, this is recorded by a sensing device (not shown in the figures), which delivers a corresponding signal to a control and computing device. The latter than starts a drive (not shown in the figures) which displaces the feed device 51 towards the elements 20, and the slabs 40' are then inserted into the recesses 21'. A drive device then returns the feed device to its original position. The feed table 52 is then ready to accept new slabs.

The control and computing device then starts the drive device for rotating the shaft 30 (the drive device is not shown in the figures), and the drive device then imparts to the shaft the rotary movement necessary for an empty recess to stop in the feed position. This empty recess is either the next recess in the direction of rotation or a recess located further on, the intervening recesses being either empty or containing slabs. The positions of the shaft 30 and thus of the elements are determined by the locking device 31 together with the gearwheel 32.

After a number of rotary movements, the slabs will have passed once or several times through the liquid and will be in the discharge position. The control and computing device starts the drive mechanism for the movement of the ejector device 61 toward the storage device 62 (the drive device is not shown in the figures). The ejector device pushes the dipped slabs into an empty compartment in the storage device, and the ejector device then returns to its original position. This is recorded by the control and computing device, which starts the drive device 63. This moves the storage device 62 one step upwards if discharge takes place in accordance with FIG. 1 or one step downwards if discharge takes place as shown in FIG. 2.

When the control and computing device finds that as many plates 40' have been fed in as the number of compartments in storage device 62, feed of undipped plates into the recesses in elements 20 will be interupted. After a number of rotary movements and subsequent discharges, all compartments in storage device 62 will be filled with slabs and all recesses 21 in the elements 20 will be empty. The storage device 62 is then replaced by an empty storage device and the process described above is repeated.

The invention is particularly well-suited for use in the impregnation of lining slabs with a silicone suspension. However, the invention is not limited to this application and is well-suited for dipping plates in a liquid for other applications, such as for cleaning, for protective coating, for impregnation of another nature than that described above, etc.

In addition to the above description and summary, the invention is also described in the accompanying claims.

What is claimed is:

1. Device for dipping plates or similar articles in a liquid, the device comprising a number of disc-like elements secured at a certain distance from each other along a basically horizontally arranged shaft which is rotated, preferably in steps, by a drive device, each element being provided with recesses of a rectangular shape for receiving the plates, every recess being open at the periphery of the corresponding element and being basically oriented towards the center area of the element, the recesses in one element being arranged in line with the recesses in other elements and the elements being partially immersed in a liquid, whereupon the recesses and the plates contained in the recesses completely or partially pass through the liquid when the shaft rotates, characterized in that the rectangular long sides of the recesses are oriented to the side of the shaft and two principally diametrically opposite recesses in the position for the insertion and discharge are thus located either below or above the level of the shaft, and the displacement devices are arranged for inserting the plates at the feed device and ejecting the plates at the receiving device in the longitudinal direction of the rectangular recesses and, wherever applicable, for being able to move between the disc-like elements and to pass the shaft.

2. Device according to claim 1 further including guide rails forming semi-circular arcs below and in the vicinity of the peripheries of the elements, characterized in that the planes through these semi-circular arcs form an inclined angle to the center axis of the elements, whereupon plates with a higher density than that of the liquid will be retained by the guide rails in the recesses of the elements on their passage through the liquid.

3. Device according to claim 1 or 2, characterized in that the receiving device is arranged with storage surfaces located in a number of storage compartments located one above the other which are displaced vertically in step with the intermittent rotation of the elements for successively setting the storage surfaces to the receiving positions.

4. Device according to claim 3, characterized in that a control and computing device is arranged for receiving signals every time plates are inserted into receses of the elements, plates are ejected from recesses of the elements and the storage surfaces of the receiving device are displaced vertically in steps and that the control and computing device is arranged to deliver starting and stopping signals to the drive devices actuating the shaft, displacement devices and receiving device.

5. Device according to claim 4, characterized in that the control and computing device is arranged for recalculating the number of feed operations to the number of storage compartments in the receiving device and delivering signals to the drive device for the feed device for interrupting the feed of plates no later than when the number of feed operations is the same as the number of storage compartments in the receiving device.

* * * * *